United States Patent
Ishihara et al.

(10) Patent No.: US 6,815,630 B1
(45) Date of Patent: Nov. 9, 2004

(54) WIRE ELECTRIC DISCHARGE MACHINE

(75) Inventors: Shuichiro Ishihara, Tokyo (JP); Hisashi Yamada, Tokyo (JP); Yoichi Otomo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/380,948

(22) PCT Filed: Sep. 28, 2000

(86) PCT No.: PCT/JP00/06691
§ 371 (c)(1),
(2), (4) Date: Mar. 20, 2003

(87) PCT Pub. No.: WO02/26434
PCT Pub. Date: Apr. 4, 2002

(51) Int. Cl.$^7$ ................................................. B23H 7/10
(52) U.S. Cl. .................................................... 219/69.12
(58) Field of Search ...................... 219/69.12

(56) References Cited

U.S. PATENT DOCUMENTS 4,417,118 A * 11/1983 Miyano .................... 219/69.12
5,523,538 A * 6/1996 Matsuda ................... 219/69.12

FOREIGN PATENT DOCUMENTS

| EP | 219587 A | 4/1987 |
| JP | 59-232730 A | 12/1984 |
| JP | 63-114820 A * | 5/1988 |
| JP | 1-092029 A | 4/1989 |
| JP | 5-57529 A | 3/1993 |
| JP | 5-301122 A * | 11/1993 |
| JP | 9-108951 A * | 4/1997 |
| JP | 9-192935 A | 7/1997 |
| JP | 9-267221 A | 10/1997 |
| JP | 2000-158237 A * | 6/2000 |

OTHER PUBLICATIONS

International Search Report for PCT/JP00/06691 dated Dec. 26, 2000.

* cited by examiner

*Primary Examiner*—Geoffrey S. Evans
(74) *Attorney, Agent, or Firm*—Sughrue Mion, PLLC

(57) ABSTRACT

Wire electric discharge machine in which traveling direction of wire electrode is changed by lower roller arranged at lower portion of a workpiece, wire electrode is held and pulled by capstan roller and pinch roller, and electric power is supplied between wire electrode and workpiece while wire electrode is traveling so that workpiece is machined by electric discharge energy, capstan roller and pinch roller are arranged so that angle θ by which the traveling direction of wire electrode is changed by capstan roller and pinch roller, can be 0°<θ<90° directed upward with respect to traveling direction of wire electrode, direction of which is changed by lower roller. Breakage of wire electrode can be supressed. Feed of wire electrode can be automated. When wire cutter is used, entry of machining solution into wire cutter can be prevented. When wire cutter is not used, accommodation of used wire electrode can be enhanced.

5 Claims, 7 Drawing Sheets

| θ (°) | 0 | ±10 | ±15 | ±30 |
|---|---|---|---|---|
| CRITICAL TENSION OF BREAKING OF WIRE (N) | 19.6 | 20.0 | 20.6 | 24.5 |

FIG. 5 CONVENTIONAL
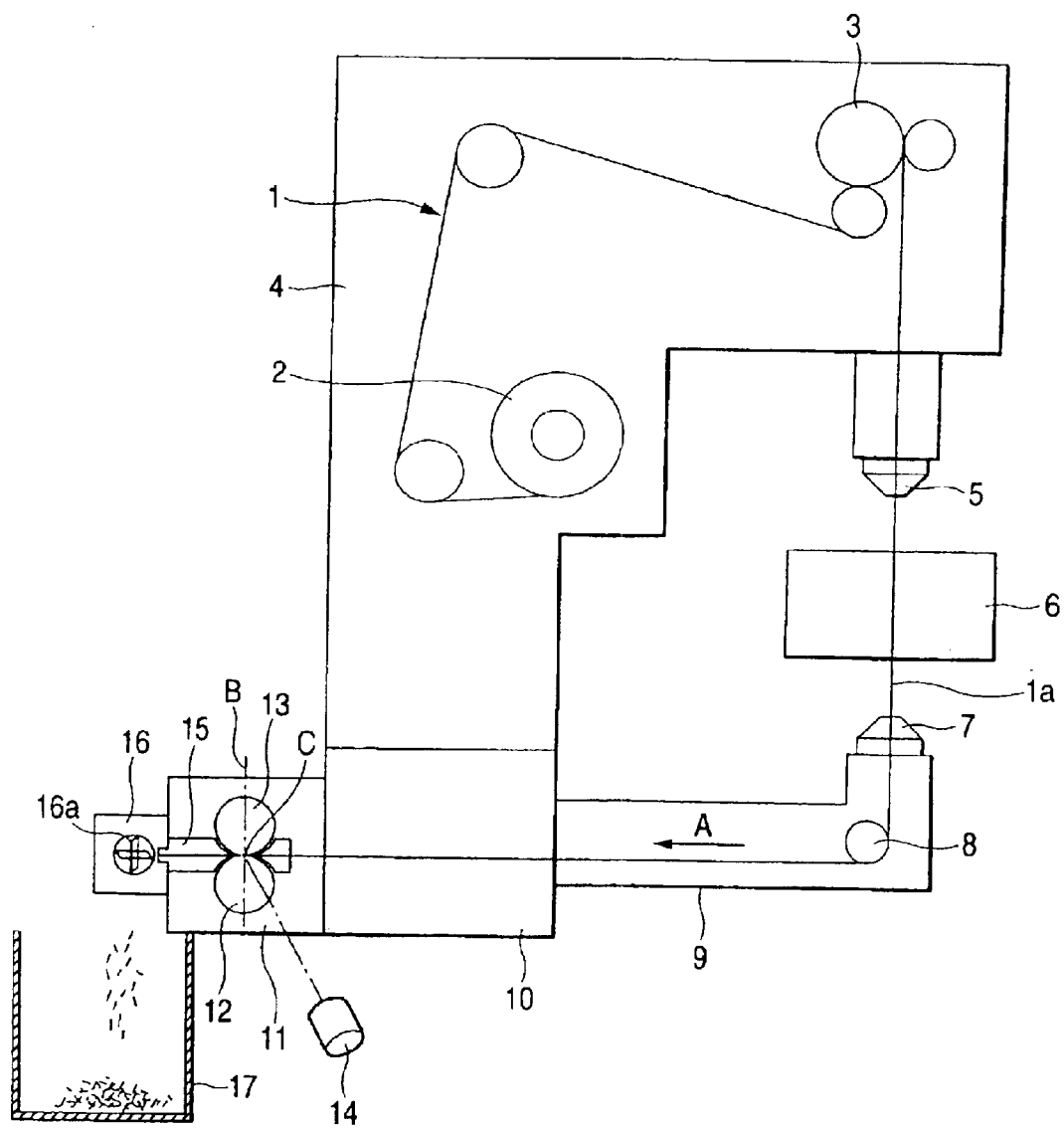

FIG. 6 (a) CONVENTIONAL
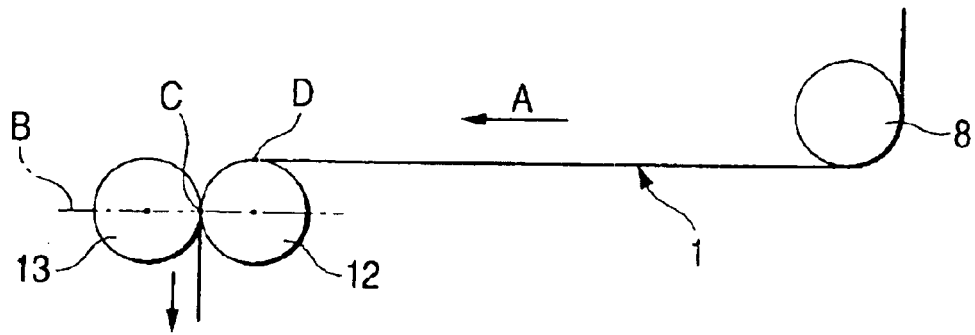
FIG. 6 (b) CONVENTIONAL
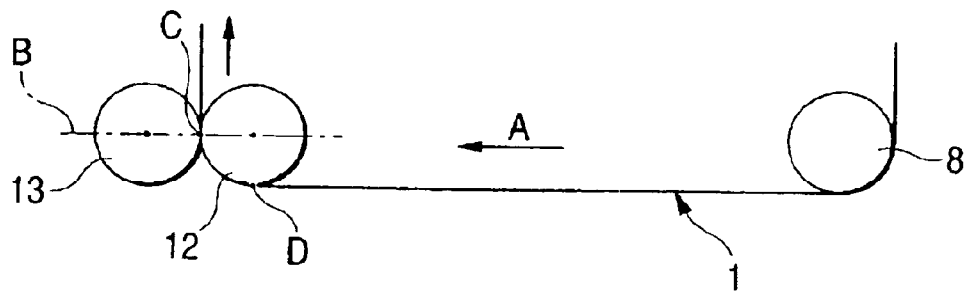
FIG. 6 (c) CONVENTIONAL
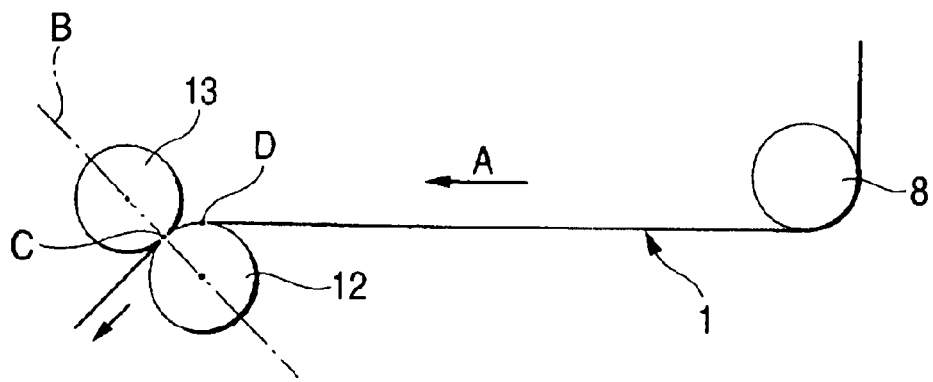

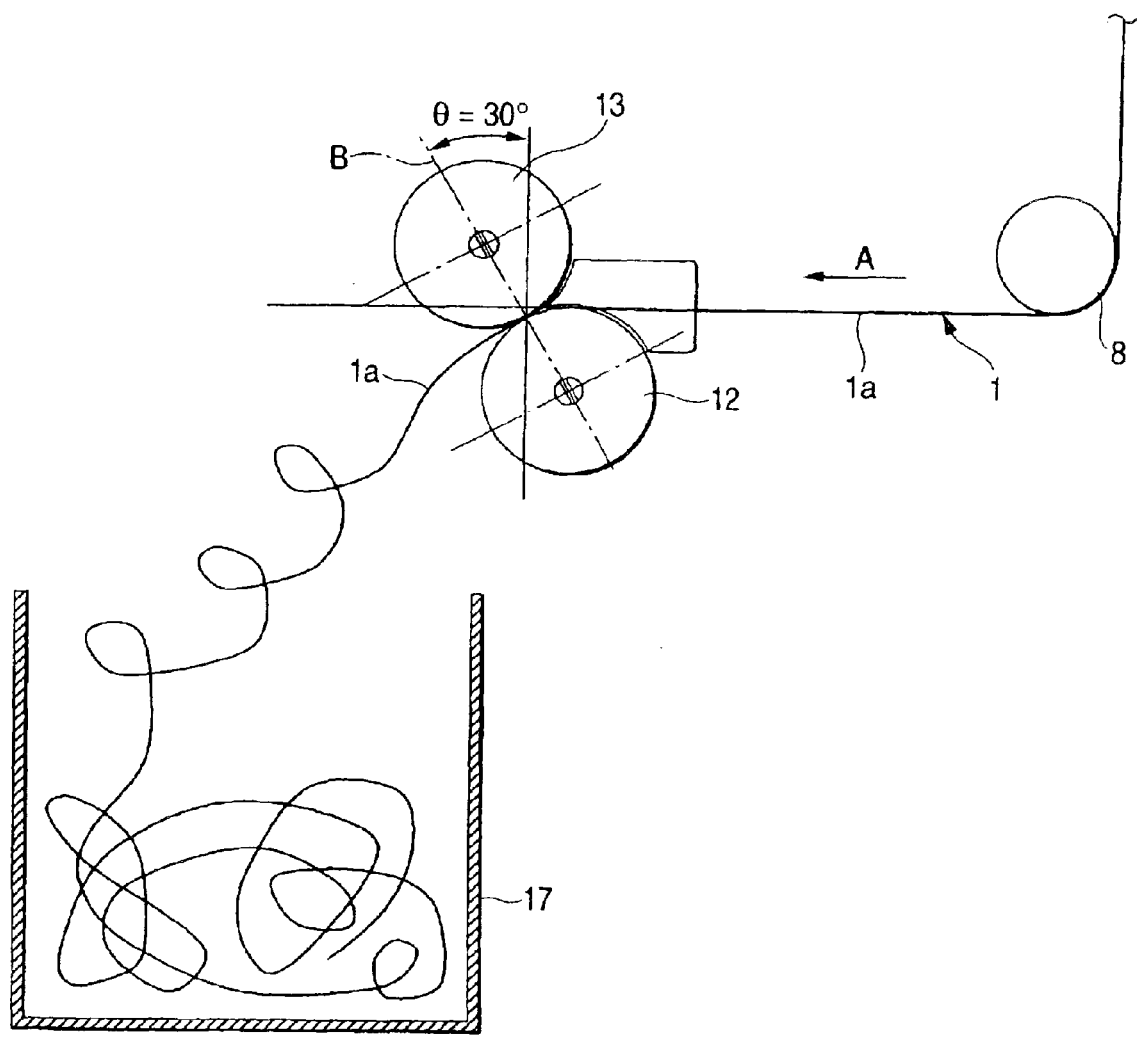
FIG. 7 CONVENTIONAL

WIRE ELECTRIC DISCHARGE MACHINE

TECHNICAL FIELD

The present invention relates to improvements in a wire electric discharge machine to conduct machining on a workpiece by electric discharge energy when electric power for machining is supplied between a wire electrode and the workpiece.

BACKGROUND ART

FIG. 5 is an arrangement view showing a conventional wire electric discharge machine. In the drawing, reference numeral 1 is a wire electrode, reference numeral 1a is a used wire electrode, reference numeral 2 is a supply bobbin, reference numeral 3 is a tension brake, reference numeral 4 is a column, reference numeral 5 is an upper guide, reference numeral 6 is a workpiece, reference numeral 7 is a lower guide, reference numeral 8 is a lower roller, reference numeral 9 is a lower arm, reference numeral 10 is a saddle, reference numeral 11 is a wire recovery section fixed to the saddle 10, reference numeral 12 is a capstan roller, reference numeral 13 is a pinch roller, reference numeral 14 is a feed motor for driving the capstan roller 12, reference numeral 15 is a hollow wire guide, reference numeral 16 is a wire cutter, reference numeral 16a is a cutting blade of the wire cutter 16, reference numeral 17 is a wire recovery box, reference mark A is a traveling direction of the wire electrode 1, the traveling direction of which is changed by the lower roller 8, reference mark B is a straight line connecting the rotational center of the capstan roller 12 with that of the pinch roller 13, and reference mark C is a point at which the pinch roller 13 is pressed against the capstan roller 12.

The pinch roller 13 comes into pressure contact with the capstan roller 12 at point C when a restoring force generated by a spring not shown acts on the pinch roller 13. The wire guide 15 is used to guide the wire electrode 1, which has passed through a wire electrode holding section provided between the capstan roller 12 and the pinch roller 13, to the wire cutter 16 (after starting wire electric discharge machining, a used wire electrode 1a is guided to the wire cutter).

Next, operation will be explained below. Tension of the wire electrode 1 is controlled by the tension brake 3 arranged on the upstream side of traveling of the wire electrode with respect to the workpiece 6. The wire electrode 1 is held by the capstan roller 12 and the pinch roller 13 which are arranged on the downstream side of traveling of the wire electrode with respect to the workpiece 6 (after starting wire electric discharge machining, a used wire electrode 1a is held by the capstan roller and the pinch roller). While the wire electrode 1 is being held between the capstan roller 12 and the pinch roller 13, the wire electrode 1 is made to travel being pulled by the driving torque generated by the feed motor 14. As described above, while the wire electrode 1 is traveling, electric power for machining is supplied between the workpiece 6 and the wire electrode 1, and wire electric discharge machining is conducted on the workpiece 6.

The used wire electrode 1a, which has been consumed in the process of wire electric discharge machining, passes through the lower guide 7, lower roller 8, lower arm 9, saddle 10 and wire recovery section 11 and is cut by the wire cutter 16 and then accommodated in the wire recovery box 17. Alternatively, in some cases, the used wire electrode 1a is dropped into the wire recovery box 17 and recovered as it is without being cut by the wire cutter 16.

Recently, due to the increases in the sizes of the supply bobbin 2 and the wire recovery box 17, the wire electrode having larger diameter can be used. In this case, the used wire electrode 1a is cut with the wire cutter 16, for example, the used wire electrode 1a is cut with the wire cutter disclosed in Japanese Unexamined Patent Publication No. 9-267221 and recovered.

As shown in FIG. 5, in the case where the capstan roller 12 and the pinch roller 13 are arranged symmetrically to each other with respect to the used wire electrode 1a, that is, in the case where straight line B connecting the rotational center of the capstan roller 12 with that of the pinch roller 13 is perpendicular to wire electrode traveling direction A which has been changed by the lower roller 8 after the completion of the electric discharge, the wire electrode supply is suitably automatized when the wire electrode is connected. However, the following problems may be encountered. Since the used wire electrode 1a, which has been consumed after the completion of electric discharge machining, is held and pulled only by pressing point C at which the pinch roller 13 is pressed against the capstan roller 12, a heavy load is given to the holding section to hold the used wire electrode 1a by the pinch roller 12 and the capstan roller 12 because tension given to the wire electrode 1 changes in the process of electric discharge machining of the workpiece 6. Accordingly, the wire electrode 1a tends to break.

FIG. 6 is a schematic illustration to explain an arrangement of the capstan roller 12 and the pinch roller 13 by which the problem of breaking of a wire electrode can be solved. In the drawing, reference mark D indicates a direction changing point at which the wire electrode traveling direction is changed from wire electrode traveling direction A. Like reference characters are used to indicate like parts in FIGS. 5 and 6.

The arrangement shown in FIG. 6(a) is disclosed, for example, in Japanese Unexamined Patent Publication No. 59-232730, and the arrangement shown in FIG. 6(b) is disclosed, for example, in Japanese Unexamined Patent Publication No. 1-92029. The arrangement shown in FIG. 6(c) is a well known arrangement commonly applied to an actual product. In any arrangement, straight line B connecting the rotational center of the capstan roller 12 with that of the pinch roller 13 is not perpendicular to traveling direction A of the wire electrode 1, the direction of which is changed by the lower roller 8. In the above arrangement, the wire electrode 1 is pulled by an outer diameter portion (portion of the capstan roller 12 round which the wire electrode 1 is wound) of the capstan roller 12 between pressing point C, at which the pinch roller 13 is pressed against the capstan roller 12, and direction changing position D at which the wire electrode traveling direction is changed from wire electrode traveling direction A. Therefore, it is difficult for the wire electrode 1 to break in this arrangement compared with the arrangement shown in FIG. 5 in which the wire electrode is pulled only by pressing point C at which the pinch roller 13 is pressed against the capstan roller 12.

However, the arrangements shown in FIGS. 6(a) and 6(b) have the following problems. When the wire electrodes 1 are connected with each other, it is difficult for the wire electrode 1, the direction of which is changed by the lower roller 8, to be automatically fed between the capstan roller 12 and the pinch roller 13. Accordingly, it is difficult to automatize the feed of the wire electrode 1. The arrangement shown in FIG. 6(c) is suitable for automatization of the feed of the wire electrode 1 in the case of connecting the wire electrode 1 with each other, however, in the arrangement shown in FIG. 6(c), the traveling direction of the wire electrode 1 is changed obliquely downward from wire electrode traveling direction A. Therefore, in the case of connecting the wire electrodes 1 with each other, since the wire electrode 1 is conveyed to the wire recovery section 11 in a machining solution, the machining solution enters the wire cutter 16 from a gap between the capstan roller 12 and the pinch roller 13, which causes a problem in which rust is generated on the cutting blade 16a.

FIG. 7 is a view showing an example in which the wire cutter 16 is not used in the arrangement shown in FIG. 6(c) and the used wire electrode 1a is dropped as it is into the wire recovery box 17 and recovered. The used wire electrode 1a, which has been consumed in the process of wire electric discharge machining, tends to curl when the traveling direction of the used wire electrode 1a is changed. Since the traveling direction of the used wire electrode 1a is changed by 90° by the lower roller 8 and then changed in the reverse direction by the capstan roller 12 and the pinch roller 13, the used wire electrode 1a is curled as shown in FIG. 7. Accordingly, the used wire electrode 1a, which has been recovered into the wire recovery box 17, becomes bulky. As a result, it is necessary to use a larger wire recovery box 17.

DISCLOSURE OF THE INVENTION

The present invention has been accomplished to solve the above problems. It is an object of the present invention to provide a wire electric discharge machine characterized in that: the occurrence of breaking of a wire electrode can be suppressed; the wire electric discharge machine is suitable for automatizing the feed of a wire electrode; a machining solution can be prevented from entering a wire cutter in the case of using the wire cutter; and a used wire electrode can be effectively accommodated in a used electrode wire recovery box in the case not using the wire cutter.

The present invention provides a wire electric discharge machine in which electric power for machining is supplied so that the workpiece is machined by electric discharge energy, and a wire cutter for cutting the used wire electrode is provided, the wire electric discharge machine characterized in that: the capstan roller and the pinch roller are arranged so that direction changing angle θ of the wire electrode, by which the traveling direction of the wire electrode is changed by the capstan roller and the pinch roller, can be 0°<θ<90° being directed upward with respect to the traveling direction of the wire electrode, the direction of which is changed by the lower roller; and a wire guide for guiding the used wire electrode passing through between the capstan roller and the pinch roller to the wire cutter is arranged.

The present invention also provides a wire electric discharge machine in which a traveling direction of a wire electrode is changed by a lower roller arranged at a lower portion of a workpiece, the wire electrode is held and pulled by a capstan roller and pinch roller, and electric power for machining is supplied between the wire electrode and the workpiece while the wire electrode is traveling so that the workpiece is machined by electric discharge energy, the wire electric discharge machine comprising: a capstan roller and pinch roller arranged so that direction changing angle θ of the wire electrode, by which the traveling direction of the wire electrode is changed by the capstan roller and the pinch roller, can be 0°<θ<90° being directed upward with respect to the traveling direction of the wire electrode, the direction of which is changed by the lower roller; a wire cutter for cutting the wire electrode after the wire electrode has passed through between the capstan roller and the pinch roller; a wire guide having a set of piping for supplying gas to support to convey the wire electrode when the gas is supplied in a direction by which the wire electrode is conveyed to the wire cutter, also having a set of piping for supplying gas to suppress a machining solution from flowing out from a gap between the capstan roller and the pinch roller when the gas is supplied toward the gap between the capstan roller and the pinch roller, the wire guide guiding the wire electrode, which has passed between the capstan roller and the pinch roller, to the wire cutter; and a compressed gas supply means for supplying compressed gas to the piping of the wire guide.

The present invention provides a wire electric discharge machine in which a traveling direction of a wire electrode is changed by a lower roller arranged at a lower portion of a workpiece, the wire electrode is held and pulled by a capstan roller and pinch roller, electric power for machining is supplied between the wire electrode and the workpiece while the wire electrode is traveling so that the workpiece is machined by electric discharge energy, and a wire recovery box for recovering the used wire electrode is provided, the wire electric discharge machine comprising: a capstan roller and pinch roller arranged so that direction changing angle θ of the wire electrode, by which the traveling direction of the wire electrode is changed by the capstan roller and the pinch roller, can be 0°<θ<90° being directed upward with respect to the traveling direction of the wire electrode, the direction of which is changed by the lower roller; and a wire guide for guiding the used wire electrode passing through between the capstan roller and the pinch roller to the wire recovery box.

A wire electric discharge machine of the present invention comprises a set of piping for supplying gas to convey a wire to the wire guide.

In a wire electric discharge machine of the present invention, the angle θ is set at about 30°.

Since the wire electric discharge machine of the present invention is composed as described above, the following effects can be provided. It is possible to suppress the breaking of a wire electrode. The wire electric discharge machine is suitable for automatizing the feed of a wire electrode. Further, when a wire cutter is used for the wire electric discharge machine, it is possible to prevent a machining solution from entering the wire cutter. When the wire cutter is not used for the wire electric discharge machine, it is possible to enhance the accommodation property of a used wire electrode.

BRIEF DESCRIPTION OF THE DRAWINGS

FIG. 5 is an arrangement view showing a conventional wire electric discharge machine.

FIGS. 6(a) to 6(c) are schematic illustrations showing a conventional arrangement of a capstan roller and pinch roller for solving the problem that a wire electrode tends to break.

FIG. 7 is a schematic illustration showing a case in which a wire cutter is not used and a used wire electrode is dropped and recovered into a wire recovery box as it is.

BEST MODE FOR CARRYING OUT THE INVENTION

Embodiment 1

Figure 1:
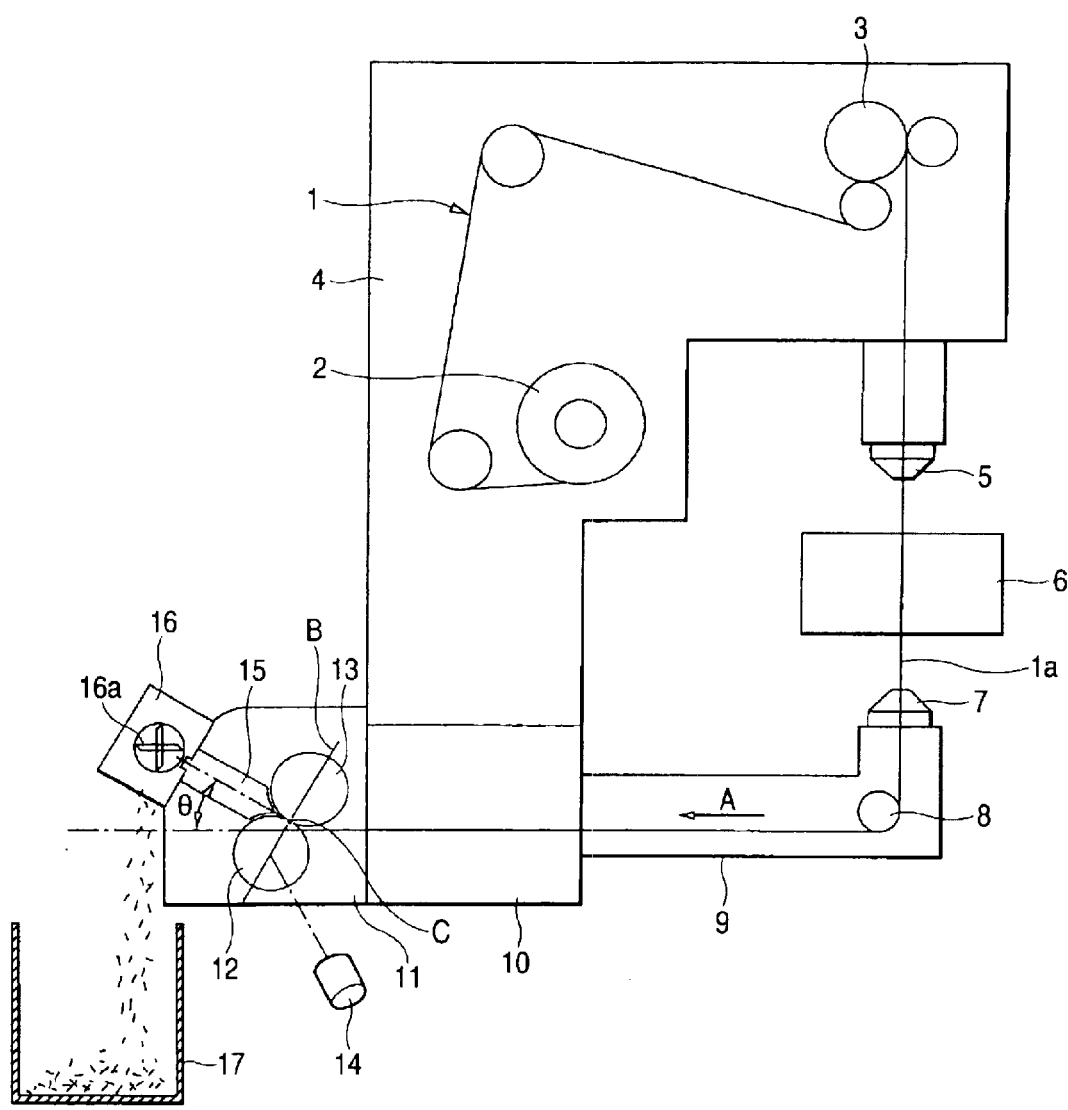
FIG. 1 is an arrangement view showing a wire electric discharge machine of Embodiment 1 of the present invention.

FIG. 1 is an arrangement view showing an example of the wire electric discharge machine of Embodiment 1 of the present invention. In the drawing, reference numeral 1 is a wire electrode, reference numeral 1a is a used wire electrode, reference numeral 2 is a supply bobbin, reference numeral 3 is a tension brake, reference numeral 4 is a column, reference numeral 5 is an upper guide, reference numeral 6 is a workpiece, reference numeral 7 is a lower guide, reference numeral 8 is a lower roller, reference numeral 9 is a lower arm, reference numeral 10 is a saddle, reference numeral 11 is a wire recovery section fixed to the saddle 10, reference numeral 12 is a capstan roller, reference numeral 13 is a pinch roller, reference numeral 14 is a feed motor for driving the capstan roller 12, reference numeral 15 is a hollow wire guide, reference numeral 16 is a wire cutter, reference numeral 16a is a cutting blade of the wire cutter 16, reference numeral 17 is a wire recovery box, reference mark A is a traveling direction of the wire electrode 1, the traveling direction of which is changed by the lower roller 8, reference mark B is a straight line connecting the rotational center of the capstan roller 12 with that of the pinch roller 13, reference mark C is a point at which the pinch roller 13 is pressed against the capstan roller 12, and reference mark $\theta$ is an angle of changing a direction of the wire electrode from wire electrode traveling direction A by the capstan roller 12 and pinch roller 13.

Diameters of the outer circumferences of the capstan roller 12 and pinch roller 13 are approximately 50 to 60 mm. The pinch roller 13 comes into pressure contact with the capstan roller 12 at point C by a restoring force generated by a spring not shown in the drawing. The capstan roller 12 is driven by the feed motor 14 at the rotating speed of about 100 rpm. The wire guide 15 is used for guiding the used wire electrode 1a, which has passed through a wire electrode holding section provided between the capstan roller 12 and the pinch roller 13, to the wire cutter 16. The rotating speed of the cutting blade 16a of the wire cutter 16 is usually 1000 to 2000 rpm.

FIG. 1 is a view showing an arrangement in which the used wire electrode 1a is cut by the wire cutter 16 and then recovered into the wire recovery box 17. Operation of the entire wire electric discharge machine is the same as that of the background art shown in FIG. 5.

Figure 2:
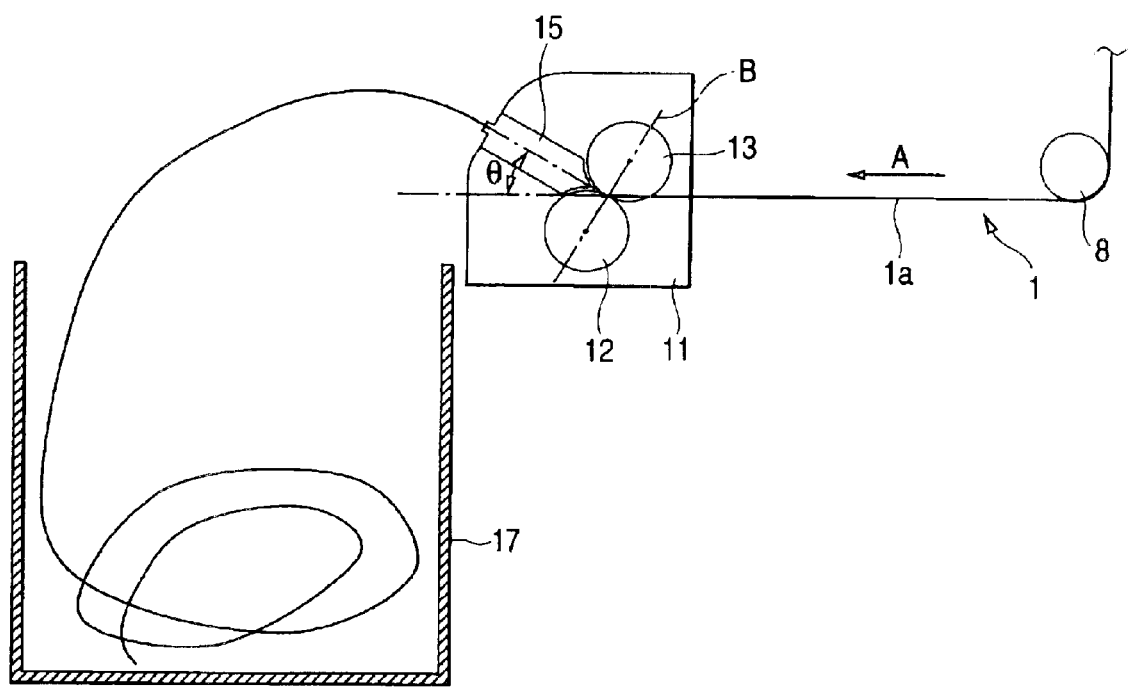
FIG. 2 is an arrangement view showing a wire electric discharge machine of Embodiment 1 of the present invention.

FIG. 2 is a view showing an example in which the wire cutter 16 is not used and the used wire electrode 1a is dropped as it is into the wire recovery box 17 and recovered. Like reference characters are used to indicate like parts in FIGS. 1 and 2.

FIGS. 1 and 2 are views showing a case in which the capstan roller 12 and pinch roller 13 are arranged so that the traveling direction of the wire electrode 1 can be changed obliquely upward by the capstan roller 12 and pinch roller 13 from traveling direction A of the wire electrode 1, the traveling direction of which has been changed by the lower roller 8 after the completion of wire electric discharge machining of a workpiece. In this case, the wire electrode traveling direction changing angle $\theta$, to which the wire electrode traveling direction is changed from wire electrode traveling direction A by the capstan roller 12 and pinch roller 13, is 30°. As described above, in the arrangement shown in FIGS. 1 and 2, straight line B connecting the rotational center of the capstan roller 12 with that of the pinch roller 13 is not perpendicular to traveling direction A of the wire electrode 1, the traveling direction of which has been changed by the lower roller 8. Therefore, in the same manner as that of the background art shown in FIG. 6, it is difficult for the wire electrode 1 to be broken in this arrangement compared with the arrangement shown in FIG. 5 of the background art in which the wire electrode is pulled only by pressing point C at which the pinch roller 13 is pressed against the capstan roller 12.

Figure 3:
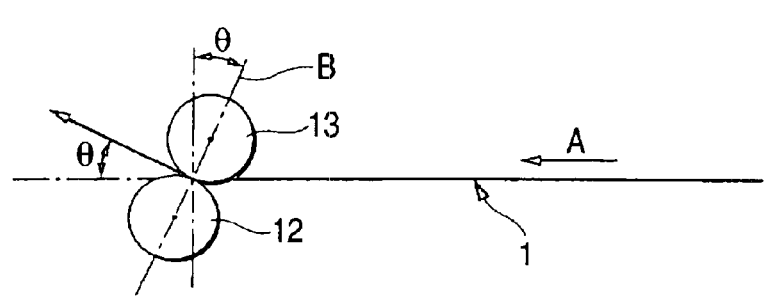
FIG. 3 is a view showing a result of a measurement in which the critical tension of breaking of a wire electrode is measured, wherein the wire electrode direction changing angle θ from wire electrode traveling direction A is used as a parameter in the measurement.

FIG. 3 is a view showing a result of a measurement in which the critical tension of breaking of the wire electrode, which was made of brass, the diameter of which was 0.2 mm, was measured, wherein the wire electrode direction changing angle $\theta$ from wire electrode traveling direction A by the capstan roller 12 and pinch roller 13 was used as a parameter. The result of the measurement shows the following. The more the absolute value of the wire electrode traveling direction changing angle $\theta$ from wire electrode traveling direction A is increased by the capstan roller 12 and pinch roller 13, the higher the critical tension of breaking of the wire electrode, that is, it becomes difficult for the wire electrode to be broken. Concerning the point at which the breaking of the wire electrode occurred, in the case where $\theta$ is 0°, ±10° and ±15°, breaking of the wire electrode occurred at a point right before the wire electrode holding section formed by the capstan roller 12 and pinch roller 13. In the case where $\theta$ is ±30°, breaking of the wire electrode occurred at the lower roller 8. In other words, according to the result of the experiment shown in FIG. 3, in the case where the absolute value of $\theta$ is 30°, the wire electrode does not break at the position where the traveling direction of the wire electrode is changed by the capstan roller 12 and pinch roller 13. As described above, the following can be understood. When the wire electrode traveling direction changing angle $\theta$ from wire electrode traveling direction A by the capstan roller 12 and pinch roller 13 exceeds a certain value, no wire electrode breaks at the position where the traveling direction of the wire electrode is changed by the capstan roller 12 and pinch roller 13.

In the arrangement shown in FIGS. 1 and 2, the wire electrode traveling direction changing angle $\theta$ from wire electrode traveling direction A by the capstan roller 12 and pinch roller 13 is not ±90°. Therefore, as explained in the item of the background art, this arrangement is suitable for automatizing the feed of a wire electrode in the case of connecting the wire electrodes with each other.

In the case where the wire cutter 16 is used as shown in FIG. 1, since the wire electrode traveling direction is changed obliquely upward from wire electrode traveling direction A and the wire cutter 16 is arranged at an upper position of a gap formed between the capstan roller 12 and pinch roller 13, it is possible to prevent a machining solution from entering the wire cutter 16. Accordingly, it is possible to prevent the generation of rust on the cutter blade 16a.

In the case where the wire cutter 16 is not used as shown in FIG. 2, the used wire electrode 1 is dropped into the wire recovery box 17 as it is so that it can be recovered. In this case, the accommodation property of the used wire electrode 1 to be accommodated into the wire recovery box 17 is important, that is, curls of the used wire electrode 1, by which the used wire electrode 1 becomes bulky, cause a big problem. After the completion of wire electric discharge machining, the wire electrode 1 is consumed. Therefore, there is a tendency that the used wire electrode 1a is curled when the traveling direction of the used wire electrode 1a is changed by the rollers. When the inventors made investigations into the diameter of a bent portion of the used wire electrode in the case where the used wire electrode, which was made of brass, the diameter of which was 0.2 mm, was accommodated into the wire recovery box 17, the following result was obtained. In the case where θ was 0°, for example, in the case where the wire cutter was not used in FIG. 5 showing the background art, the diameter of the bent portion was approximately 220 mm. In the case where θ was −30°, for example, in the case of FIGS. 6(C) and 7 showing the background art, the diameter of the bent portion was approximately 130 mm. In the case where θ was 30°, for example, in the case shown in FIGS. 1 and 2, the diameter of the bent portion was approximately 200 mm. In the case where θ is −30°, the diameter of the bent portion of the wire electrode becomes somewhat small. Therefore, for example, as shown in FIG. 7 of the background art, the wire electrode is curled and becomes bulky when it is accommodated. Accordingly, the accommodation property of the wire electrode is deteriorated. On the other hand, as shown in FIG. 2 of Embodiment 1 of the present invention, when the capstan roller 12 and pinch roller 12 are arranged so that the traveling direction of the wire electrode can be changed obliquely upward from traveling direction A of the wire electrode 1, the traveling direction of which is changed by the lower roller 8, and for example, when θ is 30°, the diameter of the bent portion of the wire electrode in the case of recovering the wire electrode is substantially the same as the diameter of the bent portion in the case where θ is 0°. Therefore, as shown in FIG. 2, the wire electrode is not curled unlike the case of accommodating the wire electrode as shown in FIG. 7. Accordingly, the accommodating property of the wire electrode can be improved.

In the cases shown in FIGS. 6(a) and 6(b) of the background art in which the angle θ of changing the wire electrode traveling direction from wire electrode traveling direction A by the capstan roller 12 and pinch roller 13 is ±90°, as explained in the paragraph of the background art, it is difficult to automatize the feed of the wire electrode 1 in the case of connecting the wire electrodes 1 with each other. In the case where θ is negative, that is, in the case of −90°<θ<0°, as shown in FIG. 6(c) of the background art, a machining solution enters the wire cutter 16 from a gap formed between the capstan roller 12 and the pinch roller 13, which causes the generation of rust on the cutting blade 16a. In the case where the absolute value of θ is not less than 90°, the wire recovery box and the wire electric discharge machine body interfere with each other, and further it becomes difficult to automatize the feed of the wire electrode.

Due to the foregoing, when the wire electrode traveling direction changing angle θ from wire electrode traveling direction A by the capstan roller 12 and pinch roller 13 is set to be 0°<θ<90°, that is, when the capstan roller 12 and pinch roller 13 are arranged so that the traveling direction of the wire electrode 1 can be changed obliquely upward from traveling direction A of the wire electrode 1, the traveling direction of which has been changed by the lower roller 8, it is possible to suppress the occurrence of breaking of the wire electrode. This arrangement further provides the following effects. This arrangement is suitable for automatizing the feed of the wire electrode. When the wire cutter is used, it is possible to prevent a machining solution from entering the wire cutter. When the wire cutter is not used, the accommodation property of the used wire electrode can be enhanced.

From the viewpoints of preventing the occurrence of breaking of the wire electrode, automatizing the feed of the wire electrode, preventing a machining solution from entering a wire cutter in the case of using the wire cutter and improving the accommodation property of accommodating the used wire electrode in the case of not using the wire cutter, as shown in the examples of FIGS. 1 and 2 showing the embodiments of the present invention, it is effective that the wire electrode traveling direction changing angle θ0 of changing the traveling direction of the wire electrode from wire electrode traveling direction A by the capstan roller 12 and pinch roller 13 is set at about 30°.

Embodiment 2

Figure 4:
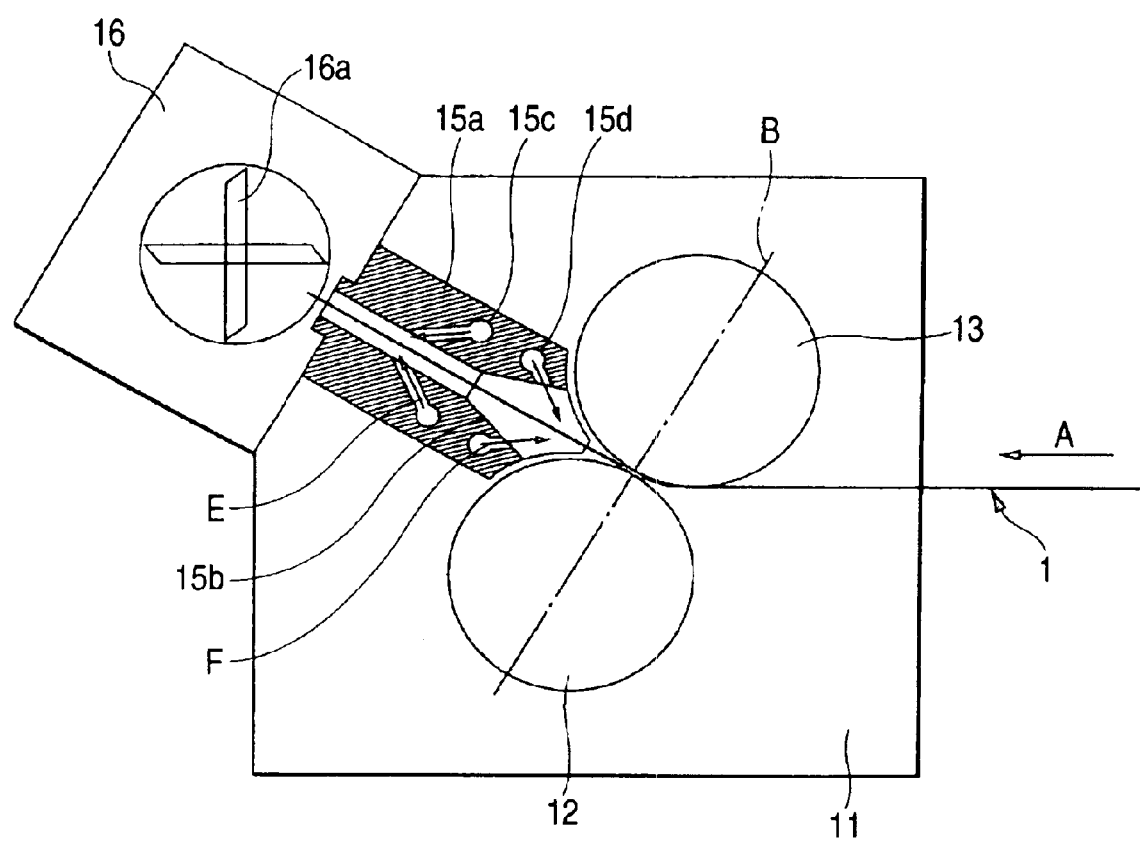
FIG. 4 is an arrangement view showing a wire electric discharge machine of Embodiment 2 of the present invention.

FIG. 4 is an arrangement view showing a wire electric discharge machine of Embodiment 2 of the present invention. In the drawing, reference numeral 1 is a wire electrode, reference numeral 11 is a wire recovery section, reference numeral 12 is a capstan roller, reference numeral 13 is a pinch roller, reference numeral 15a is a hollow wire guide, reference numeral 15b is a nozzle section of the wire guide 15a, the cross section area of the hollow section of the nozzle section is reduced toward the wire feeding direction, reference numeral 15c is a set of piping for supplying gas used for conveying a wire electrode, reference numeral 15d is a set of piping for supplying gas used for preventing a machining solution from flowing out, reference numeral 16 is a wire cutter, reference numeral 16a is a cutting blade of the wire cutter 16, reference mark A is a traveling direction of the wire electrode 1, reference mark B is a straight line connecting the rotational center of the capstan roller 12 with that of the pinch roller 13, reference mark E is a direction of supplying gas for conveying the wire electrode, and reference mark F is a direction of supplying gas for preventing a machining solution from flowing out. Concerning the gas used for conveying the wire electrode and preventing the machining solution from flowing out, air or nitrogen is used.

The arrangement of the capstan roller 12 and pinch roller 13 with respect to traveling direction A of the wire electrode 1 is the same as that of Embodiment 1 shown in FIG. 1. The entire arrangement and operation of the wire electric discharge machine of this embodiment are the same as those of Embodiment 1 shown in FIG. 1.

In the same manner as that of the wire guide 15 of Embodiment 1 shown in FIG. 1, the wire guide 15a has a function of guiding the wire electrode 1, which has passed through the wire electrode holding section provided between the capstan roller 12 and the pinch roller 13, to the wire cutter 16. The wire guide 15 includes: a set of piping 15c for supplying gas to convey the wire electrode which supports the conveyance of the wire electrode fed in a direction so that the wire electrode 1 can be conveyed to the wire cutter 16 (the direction E in FIG. 4); and a set of piping 15d for supplying gas to prevent a machining solution from flowing out from a gap formed between the capstan roller 12 and the pinch roller 13 when the gas is supplied toward the gap (when the gas is supplied in direction F in FIG. 4), the maximum value of the gap is approximately 0.3 mm.

Compressed gas may be supplied to the sets of piping 15c and 15d by a compressed gas supply means including, for example, a compressor, drier, lubricator and regulator.

When the above structure is provided, it is possible to effectively prevent the machining solution from flowing out from the gap formed between the capstan roller 12 and the pinch roller 13. Therefore, the effect of preventing the machining solution from entering the wire cutter 16 can be more enhanced than that of Embodiment 1. Accordingly, the effect of suppressing the generation of rust on the cutting blade 16a of the wire cutter 16 is high. Therefore, the reliability of the wire electric discharge machine can be enhanced.

INDUSTRIAL APPLICABILITY

As described above, the wire electric discharge machine of the present invention is suitably used for wire electric discharge machining work.

What is claimed is:

1. A wire electric discharge machine in which a traveling direction of a wire electrode is changed by a lower roller arranged at a lower portion of a workpiece, the wire electrode is held and pulled by a capstan roller and pinch roller, electric power for machining is supplied between the wire electrode and the workpiece while the wire electrode is traveling so that the workpiece is machined by electric discharge energy, and the wire electric discharge machine is provided with a wire cutter for cutting a used wire electrode used in the process of electric discharge machining, the wire electric discharge machine characterized in that: the capstan roller and the pinch roller are arranged so that direction changing angle $\theta$ of the wire electrode, by which the traveling direction of the wire electrode is changed by the capstan roller and the pinch roller, can be $0°<\theta<90°$ being directed upward with respect to the traveling direction of the wire electrode, the direction of which is changed by the lower roller; and the wire electric discharge machine is provided with a wire guide for guiding the used wire electrode passing through between the capstan roller and the pinch roller to the wire cutter.

2. A wire electric discharge machine in which a traveling direction of a wire electrode is changed by a lower roller arranged at a lower portion of a workpiece, the wire electrode is held and pulled by a capstan roller and pinch roller, and electric power for machining is supplied between the wire electrode and the workpiece while the wire electrode is traveling so that the workpiece is machined by electric discharge energy, the wire electric discharge machine comprising:

a capstan roller and pinch roller arranged so that direction changing angle $\theta$ of the wire electrode, by which the traveling direction of the wire electrode is changed by the capstan roller and the pinch roller, can be $0°<\theta<90°$ being directed upward with respect to the traveling direction of the wire electrode, the direction of which is changed by the lower roller;

a wire cutter for cutting the wire electrode after the wire electrode has passed through between the capstan roller and the pinch roller;

a wire guide having a set of piping for supplying gas to support to convey the wire electrode when the gas is supplied in a direction by which the wire electrode is conveyed to the wire cutter, also having a set of piping for supplying gas to suppress a machining solution from flowing out from a gap between the capstan roller and the pinch roller when the gas is supplied toward the gap between the capstan roller and the pinch roller, the wire guide guiding the wire electrode, which has passed between the capstan roller and the pinch roller, to the wire cutter; and a compressed gas supply means for supplying compressed gas to the piping of the wire guide.

3. A wire electric discharge machine according to claim 1 or 2, wherein direction changing angle $\theta$ of a wire electrode is approximately 30°.

4. A wire electric discharge machine in which a traveling direction of a wire electrode is changed by a lower roller arranged at a lower portion of a workpiece, the wire electrode is held and pulled by a capstan roller and pinch roller, electric power for machining is supplied between the wire electrode and the workpiece while the wire electrode is traveling so that the workpiece is machined by electric discharge energy, and the wire electric discharge machine is provided with a wire recovery box for recovering a used wire electrode, the wire electric discharge machine comprising: a capstan roller and pinch roller arranged so that direction changing angle $\theta$ of the wire electrode, by which the traveling direction of the wire electrode is changed by the capstan roller and the pinch roller, can be $0°<\theta<90°$ being directed upward with respect to the traveling direction of the wire electrode, the direction of which is changed by the lower roller; a wire guide for guiding the used wire electrode passing through between the capstan roller and the pinch roller to the wire recovery box; and a set of piping for supplying gas to convey the wire electrode to the wire guide.

5. A wire electric discharge machine in which a traveling direction of a wire electrode is changed by a lower roller arranged at a lower portion of a workpiece, the wire electrode is held and pulled by a capstan roller and pinch roller, electric power for machining is supplied between the wire electrode and the workpiece while the wire electrode is traveling so that the workpiece is machined by electric discharge energy, and the wire electric discharge machine is provided with a wire recovery box for recovering a used wire electrode, the wire electric discharge machine comprising: a capstan roller and pinch roller arranged so that direction changing angle $\theta$ of the wire electrode, by which the traveling direction of the wire electrode is changed by the capstan roller and the pinch roller, can be approximately 30° being directed upward with respect to the traveling direction of the wire electrode, the direction of which is changed by the lower roller; and a wire guide for guiding the used wire electrode passing through between the capstan roller and the pinch roller to the wire recovery box.

* * * * *